US010390182B2

(12) United States Patent
Swart

(10) Patent No.: US 10,390,182 B2
(45) Date of Patent: Aug. 20, 2019

(54) REAL-TIME LOCATION SYSTEM (RTLS) HAVING TAGS, BEACONS AND BRIDGES, THAT USES A COMBINATION OF MOTION DETECTION AND RSSI MEASUREMENTS TO DETERMINE ROOM-LOCATION OF THE TAGS

(71) Applicant: Infinite Leap Holdings, LLC, Fargo, ND (US)

(72) Inventor: John A. Swart, Grand Rapids, MI (US)

(73) Assignee: Infinite Leap Holdings, LLC, Fargo, ND (US)

( * ) Notice: Subject to any disclaimer, the term of this patent is extended or adjusted under 35 U.S.C. 154(b) by 0 days.

(21) Appl. No.: 16/214,890

(22) Filed: Dec. 10, 2018

(65) Prior Publication Data
US 2019/0124475 A1    Apr. 25, 2019

Related U.S. Application Data

(63) Continuation-in-part of application No. 16/010,732, filed on Jun. 18, 2018, now Pat. No. 10,231,078, (Continued)

(51) Int. Cl.
*H04W 24/00* (2009.01)
*H04W 4/029* (2018.01)
(Continued)

(52) U.S. Cl.
CPC .......... *H04W 4/029* (2018.02); *G01S 5/0036* (2013.01); *G01S 5/14* (2013.01); *H04W 4/02* (2013.01);
(Continued)

(58) Field of Classification Search
CPC ....... H04W 4/02; H04W 8/005; H04W 88/02; H04W 64/00; H04W 8/245;
(Continued)

(56) References Cited

U.S. PATENT DOCUMENTS 9,810,767 B1    11/2017 Hamilton
9,877,298 B1    1/2018 Knas
(Continued)

*Primary Examiner* — Danh C Le
(74) *Attorney, Agent, or Firm* — Frank M. Scutch, III

(57) ABSTRACT

A real-time location system (RTLS) uses transmitting and listening tags, bridges, and beacons. The fixed beacons broadcast BLE advertisements containing motion-status information about recent history of perceived motion in a room as determined from a motion sensor in the beacon. The bridges forward the beacon's received advertisements to a location engine, which records timestamps of motion events seen by each beacon in each room. One or more tags then report their own motion status based on a tag-based accelerometer. The system utilizes a series of location-engine steps, to estimate the room-location of the tags based on a specific combination of RSSI analysis, and a comparison of tag-motion history to the perceived and recorded motion-status in a room. This analysis of tag-motion history and motion-in-room status produces a better estimate of room-level location of the tag than can be estimated by simple proximity or multi-lateration using radio signal strengths.

3 Claims, 4 Drawing Sheets

Related U.S. Application Data which is a continuation-in-part of application No. 15/610,072, filed on May 31, 2017, now Pat. No. 10,028,105.

(60) Provisional application No. 62/430,559, filed on Dec. 6, 2016, provisional application No. 62/343,242, filed on May 31, 2016.

(51) Int. Cl.

| | | |
|---|---|---|
| *H04W 4/33* | (2018.01) | |
| *H04W 4/80* | (2018.01) | |
| *H04W 4/02* | (2018.01) | |
| *G01S 5/00* | (2006.01) | |
| *G01S 5/14* | (2006.01) | |
| *H04L 29/08* | (2006.01) | |
| *H04W 4/90* | (2018.01) | |
| *H04W 8/00* | (2009.01) | |

(52) U.S. Cl.
CPC ............. *H04W 4/027* (2013.01); *H04W 4/33* (2018.02); *H04W 4/80* (2018.02); *H04L 67/18* (2013.01); *H04W 4/90* (2018.02); *H04W 8/005* (2013.01)

(58) Field of Classification Search
CPC .......... G08B 13/2462; H04M 1/72519; H04M 1/72522; H04L 29/08657; G06K 7/0008; G06K 19/0723
USPC ................................ 455/456.2, 456.5, 550.1
See application file for complete search history.

(56) References Cited

U.S. PATENT DOCUMENTS

| | | | |
|---|---|---|---|
| 2007/0046434 A1 | 3/2007 | Chakraborty | |
| 2007/0247366 A1* | 10/2007 | Smith | ...... G01S 5/021 342/464 |
| 2011/0072132 A1 | 3/2011 | Shafer | |
| 2011/0080267 A1 | 4/2011 | Clare | |
| 2013/0141233 A1 | 6/2013 | Jacobs | |
| 2013/0201003 A1 | 8/2013 | Sabesan | |
| 2013/0324147 A1 | 12/2013 | Ong | |
| 2014/0351498 A1 | 11/2014 | Hsueh | |
| 2015/0002274 A1 | 1/2015 | Sengstaken, Jr. | |
| 2015/0063427 A1 | 3/2015 | Cahn | |
| 2015/0063472 A1 | 3/2015 | Chatterton | |
| 2015/0286852 A1* | 10/2015 | Sengstaken, Jr. | ....... A61J 1/035 340/10.1 |
| 2016/0029160 A1* | 1/2016 | Theurer | .................. H04W 4/02 455/456.1 |
| 2016/0029176 A1* | 1/2016 | Marti | ..................... H04W 4/029 455/456.3 |
| 2016/0260301 A1 | 9/2016 | Miller | |
| 2016/0267144 A1* | 9/2016 | Manimaran | ............. G06F 16/29 |
| 2016/0295358 A1 | 10/2016 | Cariss | |
| 2016/0295376 A1 | 10/2016 | Geng et al. | |
| 2016/0299213 A1* | 10/2016 | Jones | ....................... G01S 5/08 |
| 2017/0127128 A1* | 5/2017 | Seger | ............... H04N 21/44213 |
| 2017/0142549 A1 | 5/2017 | Herbert | |
| 2017/0142639 A1 | 5/2017 | Meredith | |
| 2017/0195834 A1* | 7/2017 | Na | ........................ G01S 5/0252 |
| 2017/0313426 A1 | 11/2017 | Morin | |
| 2018/0273344 A1* | 9/2018 | Mason | ................. B66B 5/0031 |

* cited by examiner

REAL-TIME LOCATION SYSTEM (RTLS) HAVING TAGS, BEACONS AND BRIDGES, THAT USES A COMBINATION OF MOTION DETECTION AND RSSI MEASUREMENTS TO DETERMINE ROOM-LOCATION OF THE TAGS

FIELD OF THE INVENTION

The present invention relates generally to a real-time location system (RTLS) having active tags that transmit BLE advertisements, and bridges that pass tag-location information to a location algorithm in a central server. The method defined uses a combination of motion sensors, motion detectors, and radio signal strength to determine what room a tag is located in.

BACKGROUND OF THE INVENTION

RTLS systems estimate locations for moving tags within a floor plan of interior rooms, in buildings such as hospitals. Many existing RTLS systems based on radio-frequency signals such as Wi-Fi or BLE, are designed to have moving tags that transmit a radio message, in a field of receiving devices called gateways, sensors, bridges, or Access Points. The network of gateways will use received signal strength of radio transmissions from a tag, as a proxy for estimating the distance between the tag and each gateway and use proximity or multi-lateration algorithms to estimate the locations of tags.

These approaches having tags that transmit, and location engines that are based only on multi-lateration, are standard in the industry, and provide location estimates that are acceptable for may use cases in industrial and manufacturing environments. But they fail to provide a highly accurate, room-level location fix for the environments that need to estimate which room an asset resides in, like hospitals.

RTLS systems in current use feature tags that wirelessly transmit advertisements into a field of fixed receivers, often named sensors, gateways or bridges. They attempt to locate tags by estimating a location on a floor plan (known as an (x,y) location fix for the map coordinates). Through a locating process known as multi-lateration, the one or more bridges measure the received signal strength (RSSI) of the advertisement they hear from a tag and forward that RSSI to a location engine. The location engine uses the received signal strength as an estimate of the distance between the tag and each reporting bridge, and the multi-lateration algorithm estimates the location of the tag on a floor plan by reporting the location as an (x, y) location on the floor plan. The distance between the estimated (x, y) location of the tag and its true (x, y) location on the floor plan may be called the "error". Current RTLS vendors measure their typical error (or "typical accuracy") in feet or meters. The typical error of an RTLS system is defined by a statistical population distribution of a large number of sample location estimates and their "error" measurements. Hence, RTLS-equipment vendors will often state their "typical error" or "typical accuracy" with phrases like "We are achieving 1-meter accuracy 90% of the time".

These current systems and methods of locating asset, patient and staff tags are insufficient for some hospital use cases. For example, often people and assets are located in two adjacent rooms in a hospital. One room is used to store clean equipment and the other used to store soiled equipment. Nurses need to use clean equipment to serve patients, of course, and never use soiled equipment. The clean equipment is often stored on shelves in the clean-equipment room, so imagine 50 pieces of clean equipment on a shelf that is attached to the wall that is shared with the soiled-equipment room. The adjacent soiled-equipment room also has shelves, on the opposite side of the wall, containing 50 pieces of soiled equipment. The assets all sit on shelves about six inches from the shared wall, so they are within 12 inches of the adjacent room. In this example, all 100 pieces of equipment have attached RTLS tags. The challenge of the RTLS system is to locate each piece of equipment and reliably tell the nurses which equipment is in the clean room (so it can be used) versus which equipment is in the soiled room (which cannot be used on a patient until it is cleaned and moved to the clean room).

An RTLS which uses only radio signal strength will almost always fail to discriminate the precise room-location of all 100 pieces of equipment. It may be able to locate each tag to within one meter of its true location, but it cannot tell whether the asset is one-half meter to the left of the wall, or one-half meter to the right of the wall, so it misplaces the room estimate for some assets. Thus, new solutions are required to better locate and track these assets.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
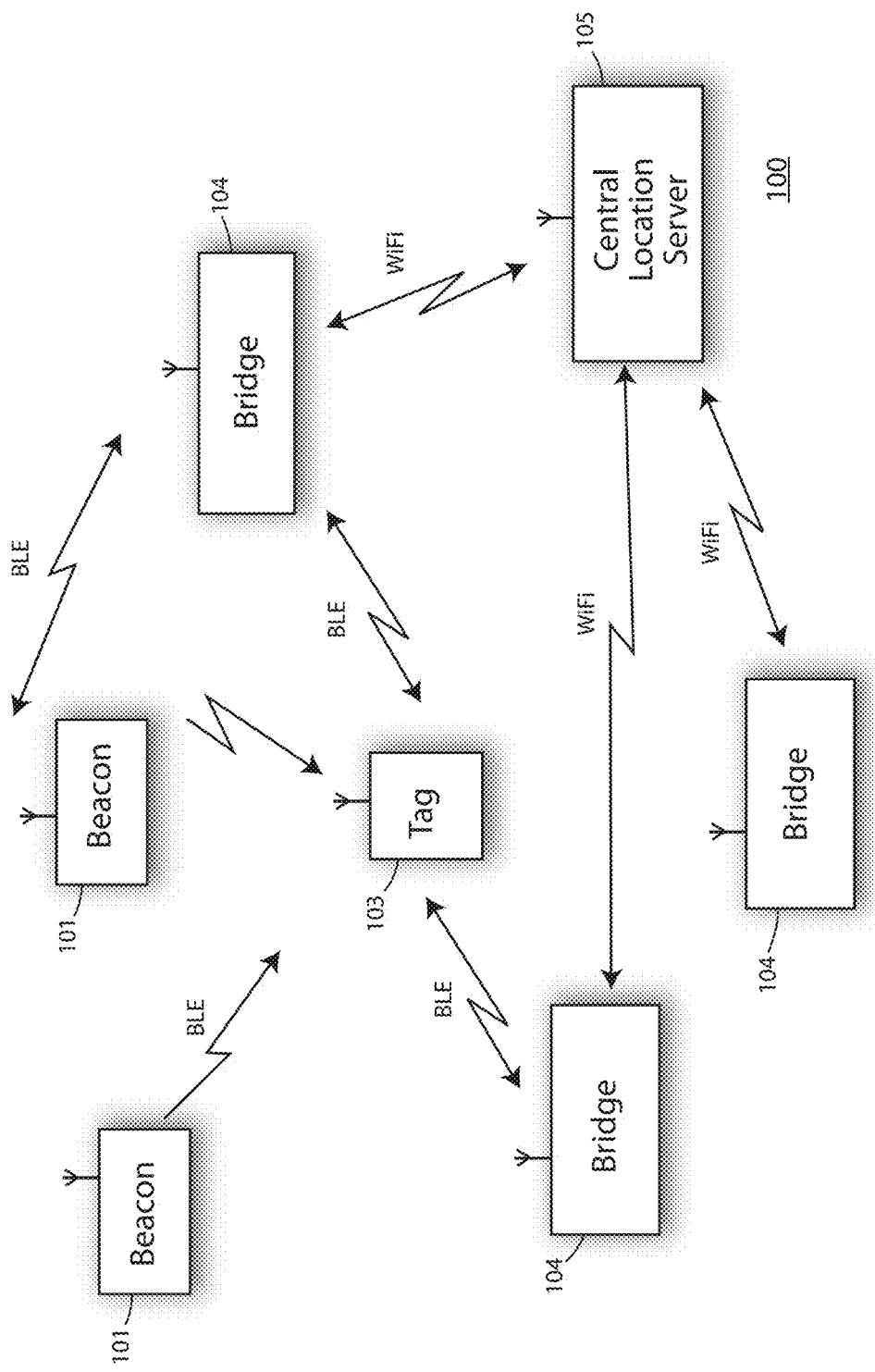
FIG. 1 a block diagram illustrating components in an RTLS, including tags, bridges, beacons, and a location engine.

Before describing in detail embodiments that are in accordance with the present invention, it should be observed that the embodiments reside primarily in combinations of method steps and apparatus components related to an RTLS having stationary beacons that advertise, active tags that transmit advertisements, and bridges that pass beacon and tag information to a location algorithm in a central server. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of RTLS having tags, bridges, and beacons. The non-processor circuits may include, but are not limited to, a radio receiver, a radio transmitter, signal drivers, clock circuits, power source circuits, and user input devices. As such, these functions may be interpreted as steps of a method to perform energy-harvesting tags, bridges with mode-instruction, and tags, bridges and beacons that self-report location changes. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 a block diagram illustrating components used in the RTLS in accordance with various embodiments of the invention. The system 100 includes one or more fixed (in-room) beacon transmitters 101 that operate using a signal transmission on one to three channels which contains a report of motion-status of moving objects in the beacon's room, as determined by a motion sensor in the beacon, a transmission that is received by a fixed infrastructure of bridges 104 and relayed to a central location server 105, constructing a database of in-room beacons and the reported motion status patterns of their rooms. The motion status reported in the beacon's advertisement is at least one bit that toggles to represent "I see motion (in my room)" or "I see no motion (in my room)" and may also be several bits to include a description of how much motion is seen, and indicators of recent history of motion-state transitions. The history of motion status may indicate that there was no motion 1 minute ago, but there is motion now. One or more tags 103 transmit a radio signal containing the tag's motion status to one or more bridges in a fixed infrastructure 104.

For a tag, the motion status is either a bit that says it is moving (or not), or numerical readings from its onboard accelerometer, or an increased transmission rate that implies that the tag is in motion. The bridge retransmits the received signal strength of the tag's message, and the tag's motion status, via Wi-Fi to a central location server 105. As is already typical in the industry, the central location server may employ trilateration algorithms on the signal strength reports it receives from multiple bridges to form one estimate of the location of the tag. The central location server 105 also processes the content of the tag's motion-status message, comparing it to the coincident motion status reported by the fixed beacons 101. The location server 105 may also analyze patterns of beacon-reported motion status over time, determining which patterns appear to be people walking along walking paths. The location server 105 may also analyze signal-strength-based tag-location estimates over time, determining which patterns appear to be tags that are traveling along walking paths with those people. All of this information, including signal strengths of tag transmissions heard at the bridges, coincident motion reports from the tags and fixed beacons, and coincidence of human movement and tag movement, is factored into the location algorithm at the central location server. The central location server produces a "location estimate" for the tag, which is defined as an estimate of which room in the building the tag is located in.

Thus, the system in FIG. 1 includes a novel feature not taught in the prior art namely; a system of beacons, tags, bridges and a location engine, which enables the location engine to combine two location estimates: one multi-laterated location estimate based on radio signals, and a second location estimate based on motion status of tags and motion reports of in-room beacons; to produce a combined location estimate, used to store a updated, estimated location of the room-location of the tag.

Figure 2:
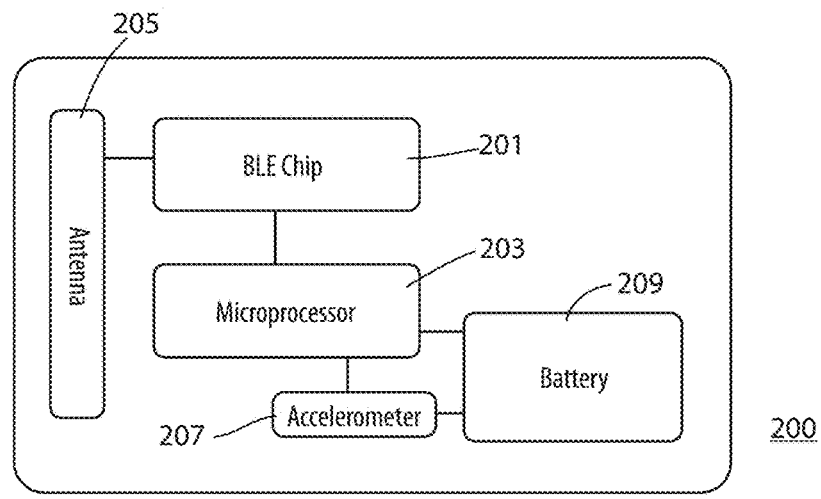
FIG. 2 is a block diagram illustrating components used in the tag.

FIG. 2 is a block diagram illustrating system components used in the tag. The tag 200 includes a transceiver 201 that works to transmit and receive radio frequency (RF) signals. The transceiver 201 is connected to a microprocessor 203 for controlling the operation of the transceiver. The transceiver is also connected to an antenna 205 for providing communication to other devices. The tag further includes an accelerometer 207 connected to microprocessor 203 for detecting motion of the tag and a battery 209 for powering electronic components in the device.

Figure 3:
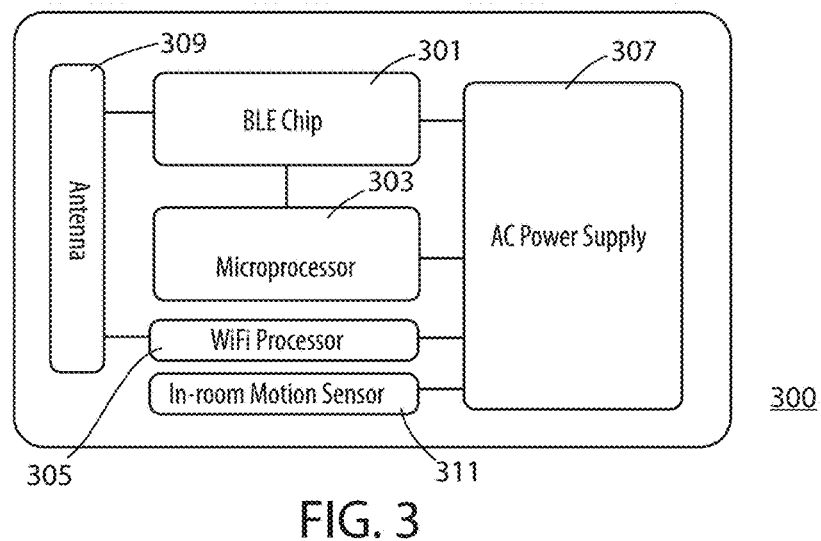
FIG. 3 is a block diagram illustrating components used in the bridge.

FIG. 3 is a block diagram illustrating components used in the bridge as seen in FIG. 1. The bridge 300 includes one or more transceivers 301 that connect to a microprocessor 303 for controlling operation of the transceiver(s) 301. A Wi-Fi processor 305 also connects to the processor 303 for transmitting and receiving Wi-Fi signals. An AC power supply 307 is connected to the transceiver 301, microprocessor 303 and the Wi-Fi processor 305 for powering these devices. The AC power supply 307 may include components for retention of some energy even after being unplugged for some time period. An antenna 309 is connected to both the transceiver 301 and the Wi-Fi processor 305 for transmitting and receiving Wi-Fi RF signals to these devices at the appropriate frequency. The bridge 300 includes an optional in-room motion sensor 311, such as a Passive-Infrared sensor, which detects human motion in the room where the bridge is located, by tracking changes in the infrared radiation in the room. The bridge 300 having a motion sensor 311 can determine the timing of any moving objects in its same room, which helps populate a system database of which rooms have moving objects at what time. This data can then be transmitted and/or stored in a database for correlation to motion status of one or more tags.

Figure 4:
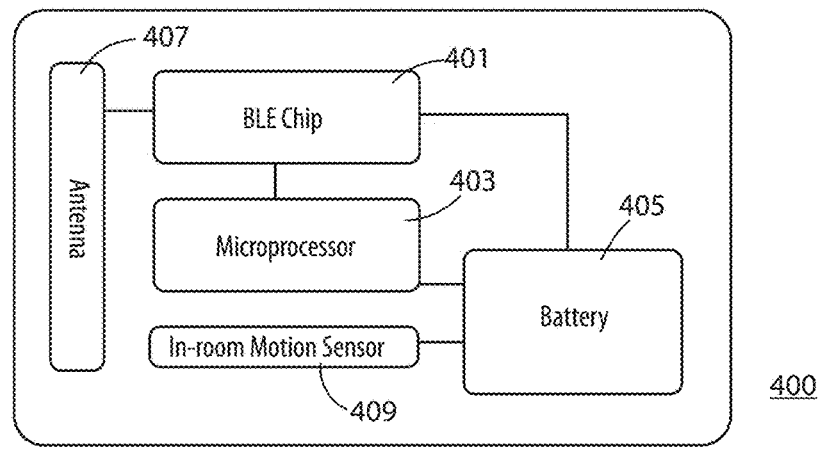
FIG. 4 is a block diagram illustrating components used in the beacon with an included motion sensor.

FIG. 4 is a block diagram illustrating components used in the beacon. The beacon 400 includes components for transmitting RF advertisements and includes one or more transceivers 401 that connect to a microprocessor 403 for controlling the transceiver(s). A battery 405 connects to the transceiver(s) 401 and the microprocessor 403 for powering these devices. As described herein, the beacon 400 typically is placed on the ceiling of a room. The beacon 400 includes one or more antennas 407 for providing gain, possibly to mitigate multipath fading between the tag and the beacon antenna. The beacon 400 includes an in-room motion sensor 409, connected to both the microprocessor 403 and battery 405. As an example, the motion sensor may be a Passive-Infrared sensor, which detects human motion in the room where the bridge is located, by tracking changes in the infrared radiation in the room. Thus, the beacon 400 having a motion sensor 409 can determine the presence and timing of any moving objects in its same room, which helps populate a system database of which rooms have moving objects at what time. This data will then be transmitted to the bridge 104 and/or stored in a database for correlation to motion status of one or more tags.

Figure 5:
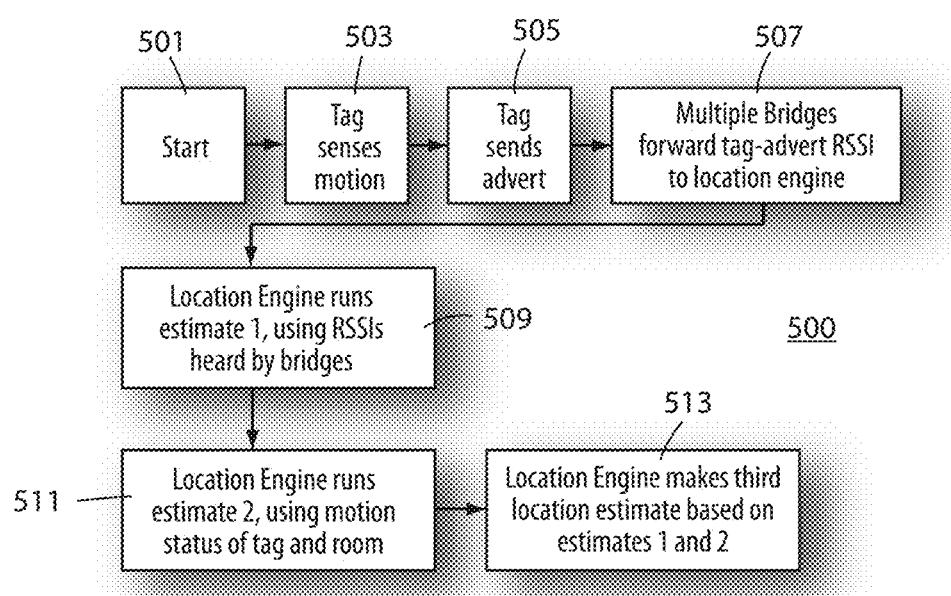
FIG. 5 is a flow chart diagram for one embodiment of the invention, illustrating the steps using transmitting tags, bridges, beacons and location engine server to estimate tag location.

FIG. 5 is a block diagram illustrating a method in using the tags, bridges and location engine server to estimate tag location. The method 500 starts 501 where a tag, using its accelerometer, senses motion 503. The tag then sends an advertisement 505, reporting its motion status as sensed by its accelerometer. Multiple bridges measure the characteristics of the tag advertisements they receive; characteristics that include at least the received signal strength (RSSI). Multiple bridges forward the tag advertisement's reported motion status and RSSI to a location engine 507, as is common in the industry. The location engine initially estimates position of the tag by using the RSSI measurement 509. Thereafter, a second estimate can be calculated that uses matching of coincident motion statuses: for example, matching the timing of the detection of motion by a bridge or beacon in a particular room 513, (the history of which is stored in a location-engine-based room-motion-history database), to the coincident timing of motion-status changes of the tag. For example, if a tag's history of motion status shows that it was moving but stopped at time "x", and only room "y" in a candidate list of rooms showed a coincident history of motion at time "x", the second estimate may locate the tag in that room "y" because of a match in coincident motion. Finally, a third location estimate is made by the location engine based on both the RSSI measurement (the first location estimate) and the motion detection by the bridges, beacons and tags (the second location estimate).

Figure 6:
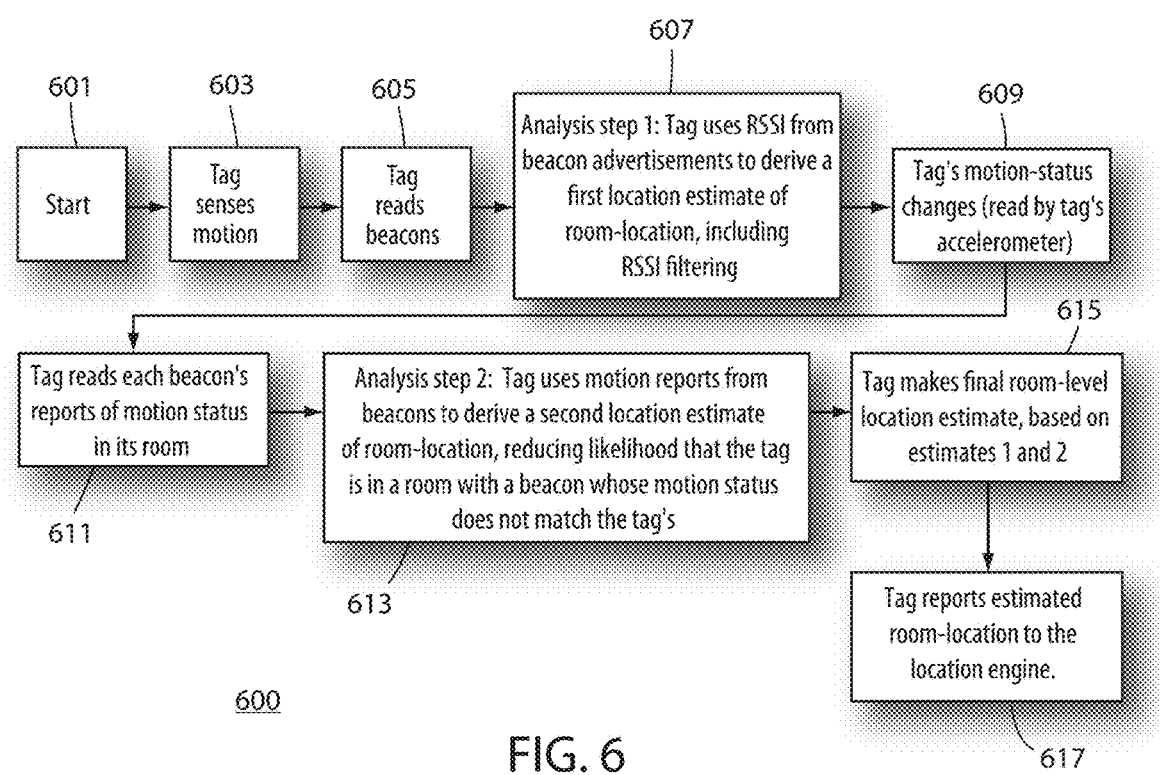
FIG. 6 is a flow chart diagram for an alternate embodiment of the invention, illustrating the steps using listening tags, bridges, beacons and location engine server to estimate tag location Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

FIG. 6 is a block diagram illustrating an alternate embodiment of the location process, using processing in a "listening" tag. The methods 600 as shown in FIG. 6 including starting the process 601 where a tag senses motion 603. The tag will listen on the channel where the beacons are transmitting and determine which beacon signals it receives 605. The tag will perform a filtering process and an analysis of the signal strength of beacons it hears, forming a first location estimate of its own room-location based on signal strengths. This analysis determines a list of neighboring beacons 607. When the tag's motion status changes, as determined by the tag's onboard accelerometer 609, the tag reads the motion status reported by each of the neighboring beacons 611. The tag performs a second analysis step 613, using motion reports from the neighboring beacons to derive a second estimate of room-location, preferring beacons whose motion status matches its own motion status. For example, a tag that knows it is moving (because of a reading from its own accelerometer) may hear two beacons. If beacon A reports "I see motion in my room" status, and beacon B reports "I see no motion in my room" status, then the tag will prefer to estimate that it is in the same room with beacon A, because of coincident motion. (The moving tag is unlikely to be in the same room with beacon B because beacon B does not see any moving tags.) The tag considers both radio signal strength and matches of motion status in an estimate of the tag's room-location 615. The tag then transmits an update message 617 to a location engine. The location engine will then record the tag's assessment of its room-location.

An advance in the current invention is the use of motion-status and in-room motion history, both in the moving tag and in the ceiling-mounted beacons. Radio frequency signals travel through walls. As a result, the location engine that relies solely on radio frequency signals to determine location has no information to determine which side of a wall that a tag is located. For some RTLS applications and use cases, determining which side of a wall an asset is on, and thereby determining which room an asset is in, is of the utmost importance. Therefore, an RTLS system may wish to estimate and report which room an asset is in, taking care to understand the wall-boundaries.

In one example, hospital assets are often stored in two adjacent rooms where the two rooms that share a common wall. One room holds clean patient-care equipment, and the second room holds soiled equipment. The equipment is placed on shelves that are against the shared wall. Therefore, from a physical-space perspective, clean assets are six inches on one side of a wall and soiled assets are six inches on the opposite side of the wall. A nurse using an RTLS system to find clean equipment needs to know which side of the wall an asset resides. Current, RTLS systems that use solely radio signals to locate the assets will struggle to provide the correct room-location estimate, in view of their relative close proximity.

In the prior art, radio signals sent by a tag to the multiple bridges will suffer from a variety of polarity fades (mismatches between the polarity of the transmitting antenna on the tag and the receive antenna on the bridge). These polarity fades work to dispel the general assumption that the RSSI of the advertisement from the tag to the bridge is directly correlated to the distance between the tag and the bridge. Therefore, this adds error to the location estimate, mis-estimating which room a clean or soiled asset is placed in. In addition, some of the tags will be blocked (by metal objects or other assets) from a clear line of sight to the one or more bridges, further breaking the correlation of signal strength to distance. Some of the tags will have their radio energy absorbed by human bodies or bags of water, further breaking the relationship of signal strength to distance. The tag may be placed in a location where it happens to suffer from a persistent multipath fade relative to a specific bridge, so that bridge will mis-estimate its distance to the tag. Finally, all of these radio fading effects are time-varying, as people and metal objects move through the hospital's rooms, so using radio signal strength alone to estimate the location of an asset tag will make a stationary asset appear to move from time to time.

The present invention uses motion sensors to help determine which room a tag is located. Motion sensors have a relative advantage in that they perceive the motion inside a room, but they are shielded (by the wall) from sensing any motion in the adjacent room. In using the system and methods of present invention, the beacon inside the clean-storage room has a motion sensor, e.g. a passive infrared (PIR) sensor. The beacon inside the soiled-storage room has its own motion sensor. Each motion sensor can detect motion of assets or people inside its room, and detect lack of motion, and perhaps detect the difference between limited motion (like a patient sitting in a chair) and walking motion. Neither motion sensor can sense any motion on the opposite side of the shared wall.

With the present invention, each beacon in each room sends a regular advertisement. When the beacon senses no motion in its room, it includes that no-motion status data in its advertisement. When the beacon senses motion in its room, it includes that motion-sensor reading in its advertisement. The beacon may also declare its motion-sense-status as more like a patient sitting in a bed, or more like a human walking through the room, for further accuracy of tag-location fixes. Further, using the system and method of the present invention, bridges are placed throughout the floor plan within receive range of each beacon. Therefore, the bridge can hear and relay to the location engine, advertisements from the beacon that inform the location engine of the motion status in each beacon's room. The location engine builds up a history of the motion patterns in each room of the hospital, which may be stored in a database. In particular, the location engine records timestamps of motion-status changes in each room, such as when a room transitions from "no motion" to "walking motion"—which it may interpret as a human walking into an otherwise quiet room. Since motion-status changes in one room are likely to be non-coincident with motion-status changes in an adjacent room, each room will have a unique "motion fingerprint" for its last few minutes of observed time.

In the system and method described herein, each tag contains an accelerometer. The tag always knows when it is moving, when it is not moving, and when it transitions from movement to stopped, with some sense of the pace of movement. Bridges or gateways can determine when a tag starts or stops moving, either explicitly because the tag includes it in a transmitted message, or implicitly because a tag transmits at a different rate when it is moving.

Further, according to the system and methods of the present invention, the location engine may execute three separate methods or algorithms. The first is a radio signal-strength (RSSI) algorithm. However, as described herein, the RSSI by itself is insufficient for determining which room all assets may reside. The algorithm can, however, determine a set of rooms that are possible/candidate locations. Thus, a second location algorithm is employed. The location engine uses its knowledge of the timestamps of motion changes in all rooms near where the first location algorithm has estimated the tag location. The second algorithm compares the tag's report of motion changes e.g. "I was moving at walking speed, and I stopped at this time" to the reported motion-status changes of three or four rooms in the vicinity of the tag. This is used to determine which room has the best match to that motion history. Room A may have had zero motion throughout that timeframe, Room B may have had limited motion throughout the timeframe, but Room C saw a coincident transition from "walking motion" to "no motion". Therefore, this second algorithm estimates that a person brought the asset into room C, put it on a shelf, and left the room. The third location engine then blends the estimate from the first and second location algorithms with some algorithmic information on room-to-room transitions that are most likely (such as "hallway" to "room"), to provide a final estimate of the room-location of each asset.

By way of example, if a clinical employee at a hospital were bringing an asset into a clean storage room and places the asset on a shelf, at the shared wall between the clean and soiled storage room where the employee leaves the asset, the system and methods according to the present invention can quickly locate the asset because the RTLS architecture places a beacon at the doorway or ceiling of each room. If the RTLS used only radio signal strength to determine location of the asset, the signal between a beacon and the asset tag in the same room may be blocked by metal objects, reduced by polarization effects, or faded by multipath interference, to the point where the asset tag hears a beacon in an adjacent room more strongly than it hears the beacon in its own room. Thus, the RTLS using only radio signal strength will provide inaccurate locations or mis-estimates of the asset. Thus, when using only RSSI measurements, if there were numerous assets lined up on the shelves on both sides of the wall, it is likely that many of the assets would be mis-estimated and recorded in the incorrect room.

The location engine may analyze multiple location reports over time, and multiple samples of room-motion status over time, to sharpen the room-location fix of a tag. In hospitals, we know that tagged assets move at walking speed between rooms ONLY when accompanied by a person. When a tagged asset is moved down a hallway and into a room, prior art systems can estimate the approximate route of the tagged asset by analyzing a series of approximated location fixes. The radio-multi-lateration system can determine, perhaps, that a tagged asset was carried on a route down a hallway and entered one of the rooms "on the left", but it cannot be certain which room was entered. Room-based motion-detecting systems in current deployment today can track human motion on a walking route, from one room, via adjacent hallways and rooms to a destination room, by tracking a set of room-based and hallway-based motion sensors that report motion in a directional sequence. A networked set of motion sensors can conclude that a human is walking a route down the hallway and (with room-level accuracy) entered a specific room. (As an example, the conclusion may be that a human has walked down the hall into room 603).

According to embodiments of the present invention, a method and system are described that can correlate the estimated route of a tag, with the room-level-accurate walking route of a walking human person. Through that correlation, the system is estimating which person is carrying or escorting that tag as it moves. (For example, if the system discerns that a tag is moving with a specific person, and the system knows the specific person has entered room 603, the system can conclude with high confidence that the tag has entered room 603). While traditional radio-based location engines can only weakly estimate which room a tag has entered, the present system and methods can use the likely association of a tag to a person, accompanied by a certainty about which room that the person has entered, to strongly estimate the room-location of the tag.

The motion sensor 409 attached to a beacon 400 may be able to discriminate multiple statuses of motion, for example it can distinguish between no motion, the motion of a patient sitting in a bed or chair, and the motion of a human walking in a room. The tag's accelerometer also can discriminate between no motion, partial-body motion, and walking motion. These multiple statuses of motion establish data points to help tags determine whether location changes have occurred for personnel-tracking. The motion of a patient sitting in a bed or chair will not fool the tag into giving erroneous data that it has moved, but instead the tag will be correlating room-changes to the walking motion i.e. the perceived coincidentally in the tag's accelerometer and the beacon's motion sensor.

Hence, the location engine in the current invention uses at least three algorithmic method and/or processes in series to estimate the location of a tag. These processes include:
1) Measurements of the signal strengths of tag advertisements, received by the bridges, employing proximity or trilateration analysis and motion-history analysis, to estimate room location from messages transmitted by the tag, as is common in the industry.
2) Each beacon will advertise the motion status as perceived by its motion sensor, and each bridge report the motion-status of each beacon it hears, allowing the location engine to develop history of motion perceived in each room. Optionally, the bridge may have a motion sensor, and the bridge may add information on the motion status it sees in its room. The location engine can combine history of motion patterns in each room with the patterns of accelerometer-determined motion changes from individual tags, to estimate the room location of a tag.
3) Finally, the tag or location engine blends its room-location estimates from the two algorithms above to finalize its location estimate for the tag.

Various embodiments of the present invention are further directed to a real-time location system (RTLS) having simple transmitting tags, bridges, and beacons. To determine which room a tag is in, beacons broadcast BLE advertisements containing motion-status information about recent history of perceived motion in a room as determined from a motion sensor in the beacon. Bridges forward the beacon advertisements they hear to a location engine, which records timestamps of motion events seen by each beacon in each room. Simple transmitting tags report their own motion status based on a tag-based accelerometer. A series of location-engine steps estimates the room-location of the tags based on a specific combination of RSSI analysis, and a comparison of tag-motion history to the perceived and recorded motion-status in a room. The analysis of tag-motion history and motion-in-room status produces a better estimate of room-level location of the tag than can be estimated by simple proximity or multi-lateration using radio signal strength alone.

An alternate embodiment of the present invention is directed to a real-time location system (RTLS) having listening tags, bridges, and beacons. Beacons broadcast advertisements containing motion-status information about recent history of perceived motion in a room as determined from a motion sensor in the beacon. Listening tags hear these broadcasts, and estimate their own room-location: first by analyzing which beacons are strongest, and then by analyzing which beacons report seeing motion at the same time that the tag is in motion. (Tags know their own motion status based on a tag-based accelerometer.) The analysis of tag-motion history and motion-in-room status produces a better estimate of room-level location of the tag than can be estimated by simple proximity or multi-lateration using radio signal strength alone.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method of estimating room-location for an asset tag, comprising the steps of:
   calculating a first location estimate for the at least one tag, based on characteristics of radio transmissions from the at least one tag, received by a fixed infrastructure of bridges, and transmitted to the central location server;
   calculating a second location estimate for the at least one tag, based on comparing changes in the history of motion status in the beacons' rooms, optional changes in the history of motion changes in the bridges' rooms and the coincident history of changes in accelerometer-determined motion status of one or more tags; and
   combining the first and second location estimates using a third location method for determining a location result for the at least one tag.

2. A method of estimating room-location for at least one asset tag used in a real-time location system (RTLS), comprising the steps of:
   calculating a first location estimate using a first location method for the at least one tag, based on radio characteristics of BLE beacon signals emitted by at least one beacon in fixed locations and received by the at least one tag;
   calculating a second location estimate using a second location method for the at least one tag, based on comparing changes in the history of motion status in the beacons' rooms, optional changes in the history of motion changes in the bridges' rooms and the coincident history of changes in accelerometer-determined motion status of the at least one tag that is likely in the room; and
   combining the first and second location estimates using a third location method for determining a location result for the at least one tag.

3. A method of estimating room-location for at least one asset tag used in a real-time location system (RTLS), comprising the steps of:
   calculating a first location estimate for the at least one tag, based on characteristics of radio transmissions from the at least one tag, received by a fixed infrastructure of bridges, and transmitted to the central location server;
   calculating a second location estimate for the at least one tag, based on comparing changes in the history of motion status in the beacons' rooms, optional changes in the history of motion changes in the bridges' rooms and the coincident history of changes in accelerometer-determined motion status of one or more tags; and
   analyzing a pattern of location estimates over time to determine a tag's route of travel;
   analyzing a pattern of human-motion-sensing reports from a set of neighboring motion sensors to determine a human person's route of travel;
   correlating a tag's route of travel with a human person's route of travel, to estimate which person is traveling with the tag; and using the first and second location estimates and room-level-accurate motion-sensed location for the human person, to estimate the room-location of the correlated tag.

\* \* \* \* \*